United States Patent Office 3,443,075
Patented May 6, 1969

3,443,075
MAN-MACHINE COMMUNICATION SYSTEM
Paul Francois Marie Gloess, Paris, France, assignor to Societe d'Electronique et d'Automatisme, Courbevoie, Hauts-de-Seine, France
Filed Sept. 28, 1964, Ser. No. 399,614
Claims priority, application France, Oct. 8, 1963, 949,904
Int. Cl. G06f 15/20; G08b 5/22; G06g 7/48
U.S. Cl. 235—151                                      9 Claims

ABSTRACT OF THE DISCLOSURE

There is disclosed herein a man to machine communication system. A programmed computer provides information to display apparatus such that a pattern of light is displayed on a viewing screen for observation by a human observer. Transducers are also provided for detecting the average light output from the screen and for determining a deviation from the average when a portion or part of the display pattern is obscured by action of the human observer. Variations in average light are applied as signals to the computer through means provided for that purpose such that the computer utilizes the said signals in conjunction with its program to apply resultant signals to the display apparatus for the purpose of changing the light display pattern.

---

Figure 1:
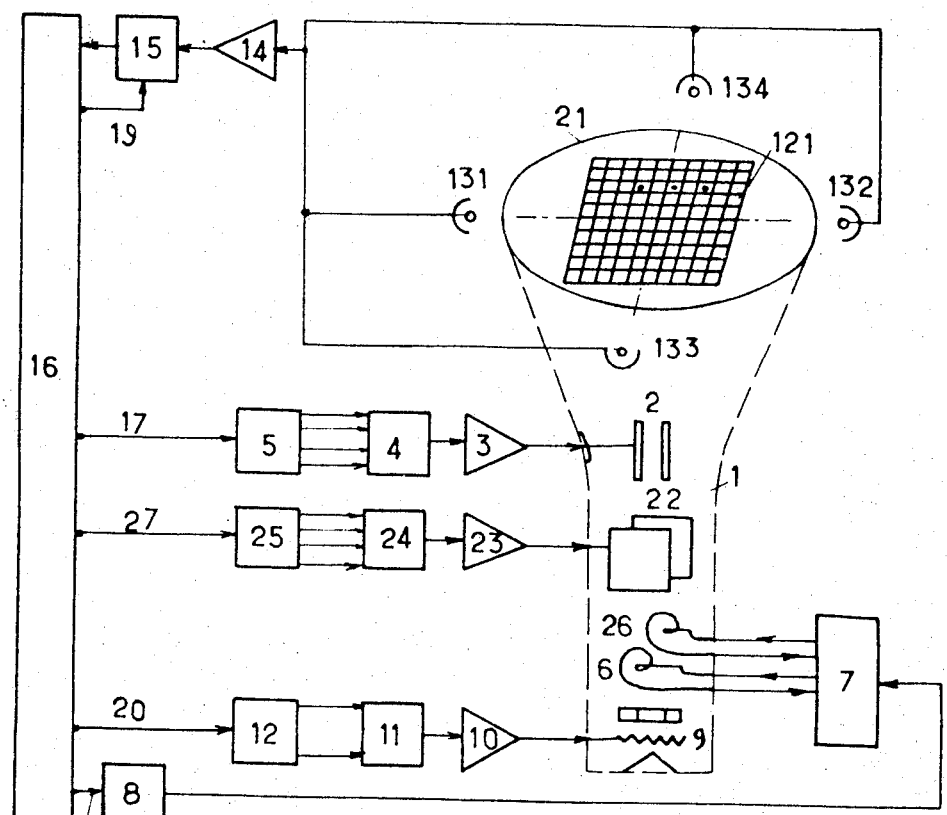

The present invention concerns improvements in or relating to systems enabling direct communication between man and machine, of the kind wherein to a program operated computer handling coded data is associated a control and display arrangement wherefrom the man can, without being obliged to encode data for the machine for processing therein, define such data through a straightforward action on said display and observe from the subsequent variation of said display if or not the machine has entered the fresh data and processed said data according to its internal program.

An object of the invention relates to such a system wherein the display includes a relatively small number of items in its visual topology, said items being organized according to a predetermined raster of a plurality of locations each of which may contain a visually characterised information element and it is the purpose of the invention to so provide such a system that the intervention of the man on the display does not necessitate that any member be electrically connected to the machine as is for instance the case in the so-called sketch-pad man-to-machine communication system.

According to a feature of the invention, such a system is mainly characterized by the combination of a cathrode ray tube or the like displaying on its screen the visual pattern of a condition of operation of the machine, means from outputs of the machine for controlling the scanning of the screen and the selective illumination thereof according to such a pattern, both in topology and light intensity, of the locations in said pattern, and means for detecting by a photoelectric arrangement any temporary occultation by the action of man of one of said location at least and for deriving therefrom coded signals applied on at least one input of the computer machine, for storing information to be processed therein and concerning such an occultation.

According to a further feature of the invention, said detecting means comprise an arrangement of photocells in a plane parallel to and in front of the screen of said visualization tube, an amplifier mixing the electrical outputs from said photocells, a circuit responsive to the variation of output of said amplifier due to temporary occultation of locations of the screen and a circuit delivering to the computer signals of detection of such occultations at time instants characteristic of the topological locations at which said occultations have been encountered on the pattern of said screen.

According to a further feature of the invention, the deflecting voltages of the cathodic spot are supplied by a decoder arrangement of digital codes from the machine and which are temporarily stored into registers external to said machine but connected to outputs thereof, analogue amplifiers being connected to said decoders for amplifying the signals resulting from such a digital-to-analog conversion in said decoders.

According to a further feature of the invention, means are provided for a regular alternation of display control periods and occultation detection periods at such a rate that the display is maintained for the eyes of an operator, said means including means for applying a test signal on the Wehnelt of the cathode ray tube or another light control electrode thereof.

Figure 2:
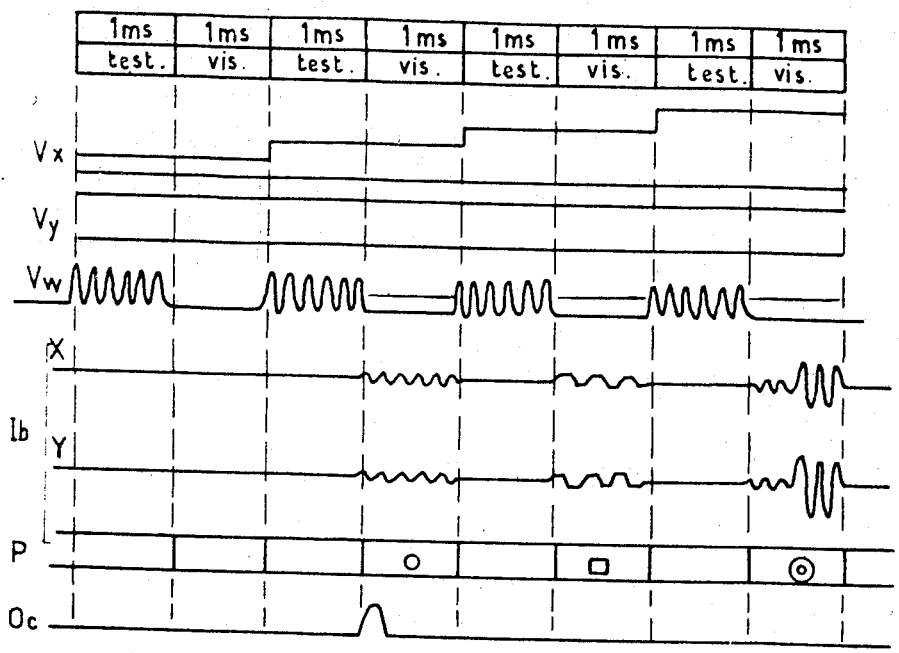

These and further features will be described in detail with relation to the accompanying drawings, wherein:

FIG. 1 shows an illustrative embodiment of a system according to the invention; and, FIG. 2 shows graphs for the explanation of the operation of the system of FIG. 1.

In order to facilitate the description, it will be assumed that the display pattern is that of a draught-board and the man plays draughts with the machine or at least in relation with the machine. This is purely illustrative and any useful design may be substituted thereto: for instance, the display may represent a switch board with the switches appearing in two conditions, closed or open, and so forth. The machine can receive display information from other members than the display and control system, it being solely one of the peripheral equipments with respect to the machine, and the machine can have output equipments giving instructions to other peripheral controlled equipments in response to actions of the man on the display.

The system is made for association to a program controlled machine having multiple and addressable or indexable input and output connections, so that said inputs and outputs can be selected in the course of execution of an instruction program from coded addresses appearing in the instructions of such a program. Such a machine is not per se part of the invention, as many kinds of computer organizations are well known. Illustratively, one may refer to "A Third Survey of Domestic Electronic Digital Computing Systems," Report No. 1115 published Mar. 1961 by the U.S. Department of Commerce, which as disclosed by its title gives a repertory of a third general survey of nonmilitary purpose digital computer systems. In said report, for instance, p. 843, is disclosed a machine called "R W 400" with thirty-two input members and as many output ones, connectable to the machine through a connection adapter of peripheral or environment members.

The screen 21 of the cathode ray tube 1 carries a light display 121 in the shape of a draught-board as said, with one hundred squares, fifty of which serve for the "men" of the game. Said pattern may be merely provided by a translucent mask applied on the screen or it may be electronically made from a permanent control of the scanning and light controlling members of the tube from a raster set of signals applied thereto. The "men" may be represented, for instance, by light circles and light squares at the suitable places in the board, see for instance line P of the graphs in FIG. 2 and, for instance, and a "king" may for instance be represented by two circles or two squares one within the other. The tube 1 is provided with two pairs of deflecting plates 2 and 22 for the scanning of the raster of the tube, with an additional pair of deflecting coils such as 6 and 26 for controlling the "men" drawings, and a control electrode, i.e. a Wehnelt electrode 9 for controlling the light of the screen 21. Of course, it also includes all the necessary usual elements such as cathode, electron gun, accelerator and concentrating electrodes and so forth.

The voltages applied to the deflector plates are supplied from amplifiers 3 and 23 respectively, which amplify the output voltages of register decoders 4 and 24 respectively connected to digital registers 5 and 25. Said registers are fed from outputs 17 and 27 of the computer, only shown as a block 16. Each one of the registers 5 and 25 is a four digit temporary store in the shown example as sufficient for determining with four binary digits any address of any single row or column (respectively) in the draught-board. Only five positions are further used in the concerned case. The row deflecting voltage $V_x$ varies at regular time intervals and in regular sequence from level zero to the upper one, five levels of voltage being sufficient for the row deflection in the tube. Each time interval is for instance equal to 2 millisec. The column deflection voltage $V_Y$ will vary by equal steps in time intervals each step equal to ten times ten millisec. Of course, the graphs in FIG. 2 are only partial representation of said voltage variations. Actually, the scanning spot of the cathode ray tube advances normally for scanning the board with the exception that it stays a predetermined time at each step within one of the square of the board.

The control electrode 9 of the tube receives a control voltage $V_W$ from an amplifier 10 fed with the voltage of a decoder 11 connected to the register 12, itself fed from an output 20 of the computer. Register 12 is a two-binary digit register and consequently presents three possible conditions: a condition whereat the spot is switched off the screen, no illumination of said spot on said screen; this condition defines an unoccupied square of the board; a condition whereat the spot is switched on together with the superimposition of a high frequency modulation for a check of unoccupied of a square by a "man"; and a third condition whereat the cathode ray spot is lighted and modulated for giving the representation of a "man" on the board. It may be noted that the high frequency component in the voltage $V_W$ is mainly intended for discriminating against ambient light and diffused screen light during each test period of a square condition of the board. As it will be later on detailed, each 2 millisecond period of variation of $V_x$ is divided into two one-millisecond periods, marked "test." and "vis." in the graphs of FIG. 2 and from the graph $V_W$ it is clear that the high frequency modulation is applied to the control electrode 9 during each one millisecond "test." period.

The deflecting coils 6 and 26 are supplied with the electrical current from a signal generator 7 which actually includes four generators of distinctive signals for the appearance of any selected pattern of a "men" or a "king" in a square of the draught-board: circle, square, concentric circles and concentric squares (three illustrative shapes of such signals are shown in the graphs Ib, lines X and Y, of FIG. 2, assuming X is the row deflection coil signal 6 and Y, the column deflection coil signal 26. Line P gives the representations obtained on the cathode ray screen 21. The selective connection or application of the output from one of said signal generators to the deflecting coils may be for instance considered as obtained by the activation of connection gates under the control of the condition of a four position electronic switch such as 8 itself controlled by an output 18 from the computer 16. Alternatively, the signals from 8 may unblock the signal generators which are otherwise blocked. As shown for the representations adopted for the men and kings, the signal generators are mere sine wave and trapezoidal wave generators, the kings necessitating a change of amplitude in one-half of the "vis." period, said amplitude remaining constant for the men in such a period.

The frequencies of the signals issuing from the computer at its outputs 17 and 27 for the scanning of the raster of the draught-board, 18 for the control of the generator 7 and 20 for the modulation and control of the light control electrode 9 are of sufficiently high value for maintaining the visual appearance of a stable picture on the screen 21; a scanning perod of 100 milliseconds for the screen, as described in the example, suits such a condition. The pattern of the game is then permanently displayed on the screen 21 as it is in electrical form within the stores of the computer together with instructions of repetition of said pattern at such a rate.

The game may be played between two men or between a man and the machine, according to the program stored in 16. Each move made by a man in the game in contradistinction with the moves played by the machine, which remain purely internal to the computer except for their displaying on the screen 21, is effected by a mere occultation of the square in which presently appear the "man" he wishes to displace at the shift of such an occultation to the square to which he wishes to bring the "man." Such an occultation does not necessitate any special tool, it may be a finger or a pencil or any opaque rod the man uses. The move may comprise a capture of one or more "men" of the adverse party. The machine must be informed of such moves. To this end, photocells are arranged in a plane somewhat spaced from the plane of the screen 21. Such photocells, preferably photomultipliers, are shown from 131 and 134. The sole necessity, leading to the number of photocells and geometric arrangement thereof, is that, together, they detect any possible occulation on the screen. Their outputs are united on the input of a current amplifier 14 followed by an occultation responsive circuit 15. Said circuit mainly includes an integrator for utilising at best the energy supplied by the amplifier 14 whilst defining the level variations therein by demodulating the electrical current from 14. However, from a connection 19 controlled by the computer 16, said circuit 15 is solely active or unblocked during the "test." periods of FIG. 2. When the man touches with his finger or pencil a square of the screen, the circuit 15 delivers a signal such as shown at $O_C$ in the graphs of FIG. 2; said signal is reproduced at each scanning cycle of the raster of the cathode ray screen as long as the occultation is maintained; its time instant of occurrence in each cycle defines the position of the occulted square of the draught-board. The successive signals $O_C$ will be counted in the machine and interpretated for erasing and moving the "men" representations in the display according to the rules of the game entered in the program unit of the machine.

In order that the information concerning the modifications of the game by the man reaches the machine with certainty, it is necessary as said that the visualisation (or display) and the test of said visualisation regularly alternate at the rhythm of the scanning of the board or, more advantageously, at the rhythm of the scanning of each square of the board, as defined by the variations of the voltages $V_X$ and $V_Y$ and the control voltage $V_W$ of the light control electrode of the cathode ray tube is modulated with a high frequency during one-half of the time interval imparted to each time interval of scanning of any square. Each test which detects a change of light from the screen, consequently an occultation of a square, results, as explained above, in a memorization of such modification in the stores of the machine. Each move from the man is consequently recorded in the machine, the program of which analyses this move, checks if it is correct according to the rules of the game, defines the modification of the pattern of the draught-board to be made and controls such modifications from the activation of the machine outputs 18 and 20. By another output of the machine, not shown as strictly conventional, the sequence of the game may be recorded in typed form on a sheet of paper for a check by a human operator. There-after, when the machine plays with the man, it plays its own move according with its program and modifies the visualisation of the draught-board according to its own decided move. The program of the machine may be made such that the decision that a move of one of its partners is confirmed only if, after a predetermined number of occultation signals, a predetermined time has elapsed during which no further occultation signal is sent by the circuit 15. If, on the other hand, during such a predetermined interval, or if the time interval of occultation has a shorter length, the machine decides that it was not an actual move and does nothing, the pattern is not modified. From the above, it is obvious for a computer programmer how to define the characteristics of the machine program for such a kind of communication from man to machine and conversely, for each machine structure to be dealt with.

Instead of representing the "men" and "kings" of the partners by different pictures, such a discrimination can be provided by identical pictures with distinctive lines, for instance dots and dashes, solid lines, and so forth and/or by different colors, the cathode ray tube being in this case a colored television tube, and the controls being consequently adapted, mainly the generator 7 and the control register 8 responsive to signals from the computer in this respect. Such alternatives have recourse to conventional techniques in oscillography and television reproduction and consequently do not necessitate any further description. As said, the game of draughts is purely illustrative and all explanations relating thereto may be easily transposed to any other practical design as requested for the use of the system.

What is claimed is:

1. A communications system for use with a programed computer, the computer being provided with information inputs and outputs, the communications system comprising:
   a display screen upon which topological information is displayed in a small number of information display positions which are arranged according to a predetermined raster;
   light activation means for illuminating said screen and for controlling the illumination of the screen, said activation means being connected to an information output of said computer;
   a plurality of screen scanning means connected to information outputs of said computer, said means activating the display pattern on said screen;
   photo-electric means positioned to detect any light occultation by man of the display pattern of light, and to produce signals representative of such occultation;
   and output means connected to said photo-electric means for receiving the said signals and for producing resultant signals therefrom, said output means being connected to an information input of said computer.

2. A system according to claim 1, wherein said photo-electric means comprises a plurality of photocells arranged in a plane adjacent to said screen, and wherein said output means comprises:
   a current amplifier having an input connected to said photocells so as to receive all signals produced by said photocells, and having an output; and
   a circuit connected to the output of said amplifier for integrating and demodulating variations of output current from said amplifier to thereby produce the said resultant signals, said circuit being connected to an information input of the computer and said circuit being operated in synchronism with said scanning means;

3. A system according to claim 1, wherein said scanning means includes at least two binary code registers connected to information outputs of said computer, and at least two digital to analog converters, one each connected to one each of said registers where the said converters are operatively connected to apply scanning voltages to said screen.

4. A system according to claim 1, wherein said light activation means is connected to an information output of said computer and provides light display control signals and screen test control signals such that the light pattern displayed on the screen is preserved for a human observer.

5. A system according to claim 4, wherein said scanning means is operative to scan the screen in steps, and wherein a screen test control signal consisting of a high frequency modulated signal for determining whether an occultation has occurred is alternated with a light display control signal consisting of an on-off control signal for preserving the display during each scanning step.

6. A system according to claim 1, wherein said scanning and display activation means includes a plural function signal generator means connected to information outputs of the said computer, the said generator means being operative to selectively control characteristics of pieces of information forming portions of the light display pattern.

7. A light pattern communication system comprising in combination:
   a device for displaying a pattern of light, said device including means for producing a scanning raster and means for controlling the light pattern;
   a raster signal generator connected to said device for controlling said raster scanning means;
   a variable video signal generator connected to said light pattern control means for controlling the operation of same;
   pattern sensing means including light responsive transducers positioned to receive the average light of said pattern and producing a signal output representative of said average light;
   means for selectively and temporarily occulting light from said pattern to said pattern sensing means from localized points within said pattern; and
   output means including a system output controlled in synchronism with said raster signal generator and connected to said pattern sensing means for detecting during each scan the occurrence of an occultation as a variation in the signal output of said pattern sensing means.

8. A system according to claim 7, wherein said light responsive transducer means comprises:
   at least two pairs of light responsive electrical transducers arranged along two angularly distinct directions corresponding to directions of raster scanning and in a plane spaced from the display of said pattern of light; and wherein
   said output means includes a time-integrating amplifier connected to said electrical transducers so as to receive signals from said transducers and producing an output that is a resultant of said signals, and a signal blocking gate connecting said system output amplifier to said system output.

9. A system according to claim 8, wherein said video signal generator is operative for one-half of a raster scanning signal period and said blocking gate is unblocked for the remaining portion of the said raster scanning period.

References Cited

UNITED STATES PATENTS

| | | | |
|---|---|---|---|
| 2,553,245 | 5/1951 | Espenschied | 178—18 |
| 3,016,421 | 1/1962 | Harmon | 250—222 XR |
| 3,047,723 | 7/1962 | Knapp | 250—222 |
| 3,181,154 | 4/1965 | Henne | 250—217 XR |
| 3,234,512 | 2/1966 | Burkhart | 250—219 XR |

MALCOLM A. MORRISON, *Primary Examiner.*

ROBERT W. WEIG, *Assistant Examiner.*

U.S. Cl. X.R.

178—19; 250—219